United States Patent
Hose-Von Wolfframsdorff et al.

(10) Patent No.: US 7,832,290 B2
(45) Date of Patent: Nov. 16, 2010

(54) AXIAL FORCE TRANSDUCER

(75) Inventors: Joachim Hose-Von Wolfframsdorff, Alsbach-Hähnlein (DE); Oliver Jost, Langen (DE)

(73) Assignee: Tecsis GmbH, Offenbach/Main (DE)

( * ) Notice: Subject to any disclaimer, the term of this patent is extended or adjusted under 35 U.S.C. 154(b) by 210 days.

(21) Appl. No.: 12/299,309

(22) PCT Filed: Apr. 30, 2007

(86) PCT No.: PCT/EP2007/003822
§ 371 (c)(1), (2), (4) Date: Dec. 10, 2008

(87) PCT Pub. No.: WO2007/124947
PCT Pub. Date: Nov. 8, 2007

(65) Prior Publication Data
US 2009/0308180 A1    Dec. 17, 2009

(30) Foreign Application Priority Data
May 3, 2006    (DE) ........................ 10 2006 020 438

(51) Int. Cl.
*G01L 1/04* (2006.01)
(52) U.S. Cl. .................... 73/862.627; 73/760
(58) Field of Classification Search ........... 73/760–860, 73/862.61–862.69
See application file for complete search history.

(56) References Cited
U.S. PATENT DOCUMENTS

| | | | | |
|---|---|---|---|---|
| 3,556,340 A | * | 1/1971 | Davis | ........................ 220/89.2 |
| 3,822,587 A | * | 7/1974 | Makino et al. | ................. 73/581 |
| 4,911,004 A | * | 3/1990 | Leon | ............................ 73/168 |
| 5,024,107 A | * | 6/1991 | Bethe | ..................... 73/862.622 |
| 6,005,199 A | | 12/1999 | Harada et al. | |
| 6,546,790 B1 | * | 4/2003 | Halliday | ....................... 73/146 |
| 2002/0189370 A1 | * | 12/2002 | Day et al. | ............... 73/862.042 |
| 2006/0059996 A1 | * | 3/2006 | Pfeffer | ......................... 73/774 |

FOREIGN PATENT DOCUMENTS

DE    3937318 C1    5/1991
DE    4139439 A1    6/1993

OTHER PUBLICATIONS

International Search Report for corresponding International Application PCT/EP2007/003822.

* cited by examiner

*Primary Examiner*—Max Noori
(74) *Attorney, Agent, or Firm*—WRB-IP LLP

(57) ABSTRACT

Disclosed is an axial force transducer comprising a deformable element (1) which forms a measuring spring and is rotationally symmetrical to the force inducing axis as well as strain gauges (15, 18) that are arranged in pairs in areas extending in opposite directions and are connected so as to form an electrical resistance bridge. The deformable element (1) is provided with a central location hole (8) which extends radially under the effect of an axial force and whose edge (12) is connected to a deformable disk (13) via an annular rib (10), said deformable disk (13) being disposed at an axial distance from the location hole (8). The edge (14) of the deformable disk (13) radially protrudes from the annular rib (10). The strain gauges (15, 18) are applied to the face of the deformable disk (13) in pairs, inside and outside the diameter of the annular rib (10).

11 Claims, 2 Drawing Sheets

AXIAL FORCE TRANSDUCER

The invention concerns an axial force transducer comprising a deformable element which forms a measuring spring and is rotationally symmetrical to the force inducing axis as well as strain gauges that are arranged in pairs in areas extending in opposite directions and that are connected so as to form an electrical resistance bridge.

Such axial force transducers, which are also called load cells, convert the strain in the areas of the deformable element that forms the measuring spring, said strain being proportional to the axial force to be measured, into an electric signal by means of an electrical resistance bridge. The electrical resistance bridge customarily is a Wheatstone full bridge with four measuring resistances.

For this type of bridge circuit the resistances of the electrical resistance bridge comprised of the strain gauges must be charged in pairs with opposite strains (strains with different polarity signs) when the deformable element is loaded. In customary axial force transducers the areas of the deformable element that meet these requirements and thus are suitable for accommodating the strain gauges, customarily are spatially far apart so that the use of a compact force-sensing element is practically impossible.

The object of the invention therefore is to design an axial force transducer as described in the preamble so that the strain gauges that are subject to strain in opposite directions are arranged in close spatial proximity.

The object of the invention is attained according to the invention in that the deformable element comprises a central location hole which extends radially under the effect of an axial force and whose edge is connected to a deformable disk via an annular rib, said deformable disk being disposed at an axial distance from the location hole and the edge of said deformable disk radially protruding from the annular rib and in that the strain gauges are being applied to the face of the deformable disk in pairs, inside and outside the diameter of the annular rib.

The radial strain that occurs along the edge of the location hole under the effect of axial pressure load on the deformable element and that is equally distributed along the circumference, causes the deformable disk to deform in a manner so that an area located inside the diameter of the annular rib that carries one pair of the strain gauges is strained negatively (upsetting deformation) while simultaneously an area of the disk edge that is located outside the diameter of the annular rib and that carries the other pair of the strain gauges is strained positively.

If instead of a pressure force a tensile force acts on the deformable element, for example, via a connecting thread, the strain relationships described above are reversed. In the area inside the diameter of the annular rib there is a positive strain while there is a negative strain (upsetting deformation) on the edge of the disk. The axial force transducer therefore can be a pressure force and/or a tensile force transducer. Thus the load induced parallel strain of the location hole edge of the deformable element that forms the measuring spring generates two zones with opposite strains. The respective strain gauges that are applied in the respective measuring directions can register radial or tangential strains. This optimally generates the mechanical requirements for a Wheatstone full bridge.

Preferably the two pairs of strain gauges are disposed at approximately equal radial distance in relation to the mean diameter of the annular rib. It is practical to arrange the strain gauges at an angle distance of 90° in relation to each other.

In a further development of the inventive thought, the annular rib and the deformable disk form a single-piece sensor body that is connected to the location hole edge of the deformable element that forms the measuring spring. The sensor body that is equipped with the strain gauges forms a compact measuring element for recording the load-proportional deformation of the location hole edge of the measuring spring. This sensor body can be inserted in measuring springs of different sizes and different designs with the only requirement on the measuring springs being that they comprise a location hole for the sensor body whose location hole edge is deformed based on load.

Since the sensor body is not within the force flow of the axial force that is to be measured, it can have a low degree of inherent rigidity independent of the respective nominal load of the axial force transducer and therefore can be integrated into measuring springs for small loads as well.

The sensor body that is inserted in the location hole of the measuring spring of the axial force transducer divides the radial deformation of the location hole into opposite strains and thus forms the basis for an optimal recording of the strain using a full bridge circuit.

It is especially advantageous that in addition to the strain gauges that from the bridge circuit, it also is possible to apply compensating resistors and elements for zero point alignment on small surfaces on the sensor body. This means the resulting sensor is especially immune to the effect of interferences. In particular, interferences of the measuring process due to temperature differences in strain gauges that are spatially far apart are prevented for the largest part.

The strain gauges that form the full bridge, the compensation resistors and the resistors for the zero point alignment can all be arranged on a carrier that is to be applied to the sensor body so that an additional application of the sensor body with the strain gauges, solder support points and such are obsolete. Such a sensor thus can be used to equip axial force transducers with standardized sensors inexpensively.

Other advantageous embodiments of the inventive thought are the subject of additional sub-claims.

The invention is described in more detail based on an exemplary embodiment that is shown in the drawing.

The following is shown:

Figure 1:
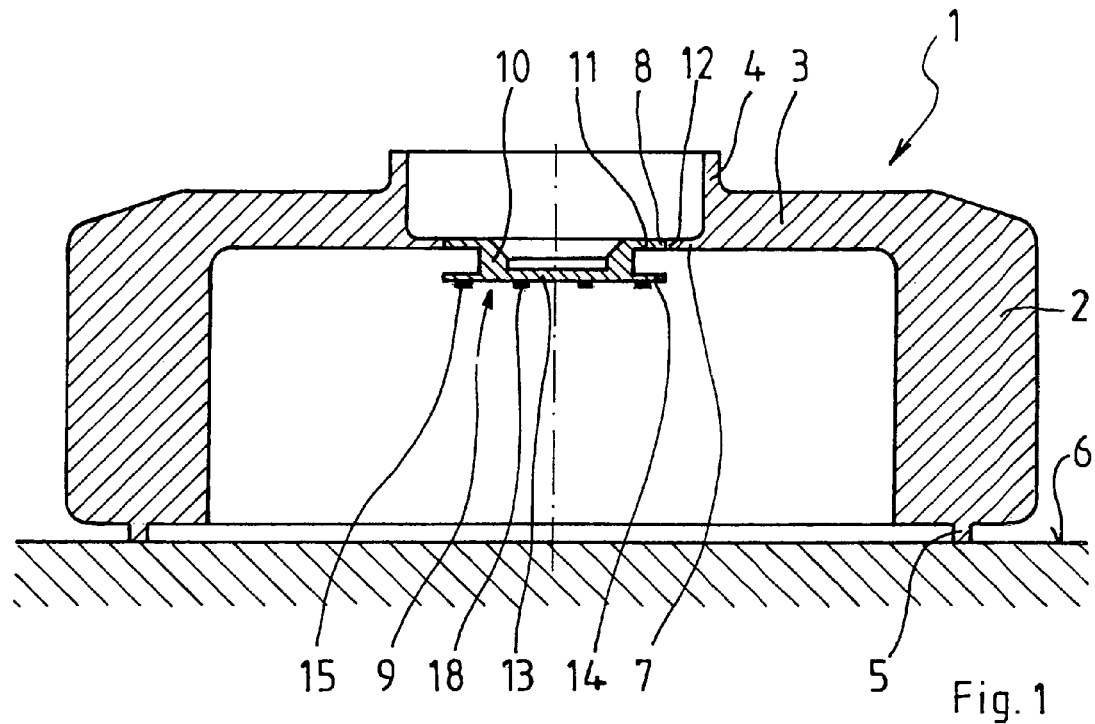
FIG. 1 shows the axial view of an axial force transducer in an unloaded state.
Figure 2:
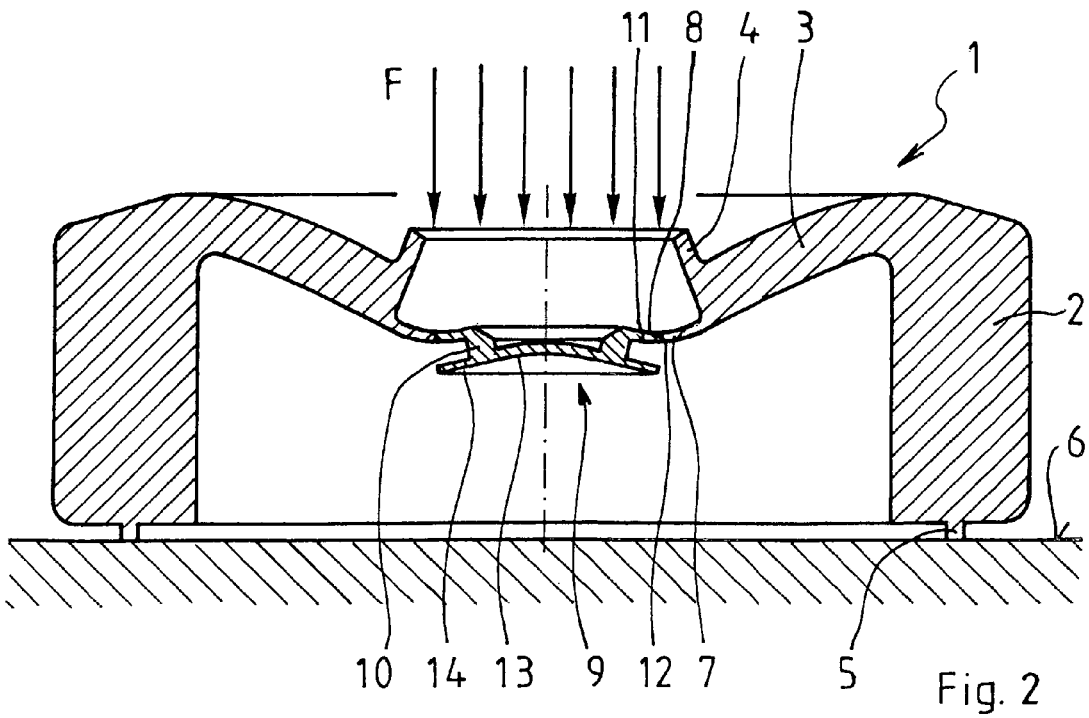
FIG. 2 shows the axial force transducer according to FIG. 1 in a loaded and deformed state with the deformation exaggerated to provide a more distinct presentation.

The axial force transducer shown in FIGS. 1 and 2 comprises a deformable element 1 that forms a measuring spring and is substantially bowl-shaped. A cylindrical ring 2 of the deformable element 1 is connected as one piece to the bottom of the bowl 3, which has an axially protruding force inducing ring 4. As indicated schematically in FIG. 2, the pressure force F that is to be measured is applied to the force-inducing ring 4 and is removed via a support rings onto a support surface 6.

The central area of the bottom of the bowl 3 is a substantially bendable membrane ring 7 that surrounds a location hole 8.

A single-piece sensor body 9 is located, preferably bonded, inside the location hole 8.

The sensor body 9 comprises an annular rib 10 that is a hollow cylindrical ring in the exemplary embodiment that is shown. The annular rib 10 is connected to the edge 12 of the location hole 8 via a radially protruding force inducing flange 11.

The annular rib 10 is connected to a relatively thin deformable disk 13 that is disposed at an axial distance from the location hole 8 while the edge 14 of said deformable disk radially protrudes from the annular rib 10.

Figure 3:
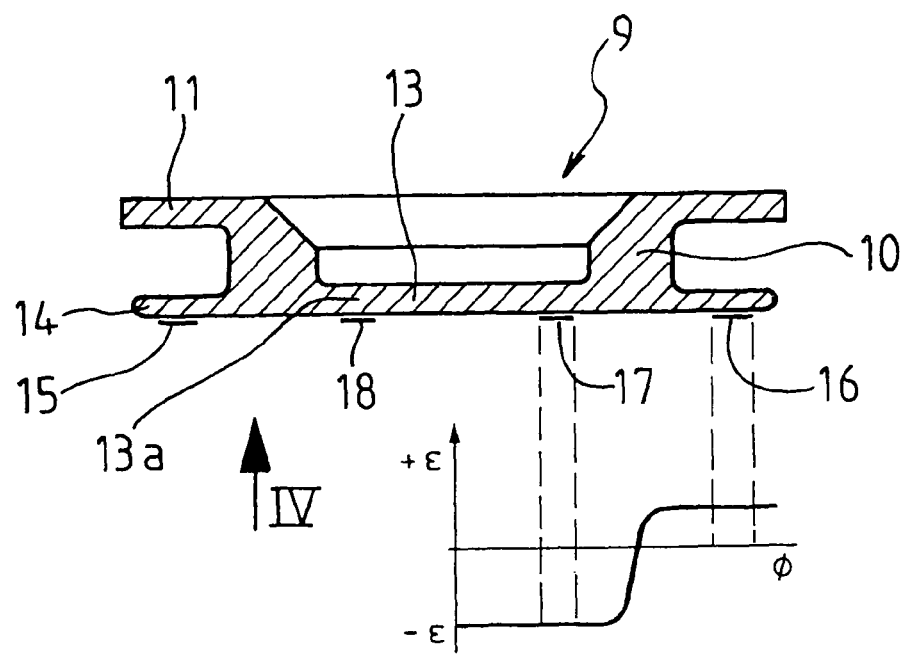
FIG. 3 shows the sensor body of the axial force transducer shown in FIGS. 1 and 2 and the applied strain gauges and with the strains applied in a diagram across the diameter of the deformable disk of the sensor body and FIG. 4 shows a view of the sensor body in the direction of arrow IV in FIG. 3 with the connection of the strain gauges into a Wheatstone full bridge being shown schematically.
Figure 4:
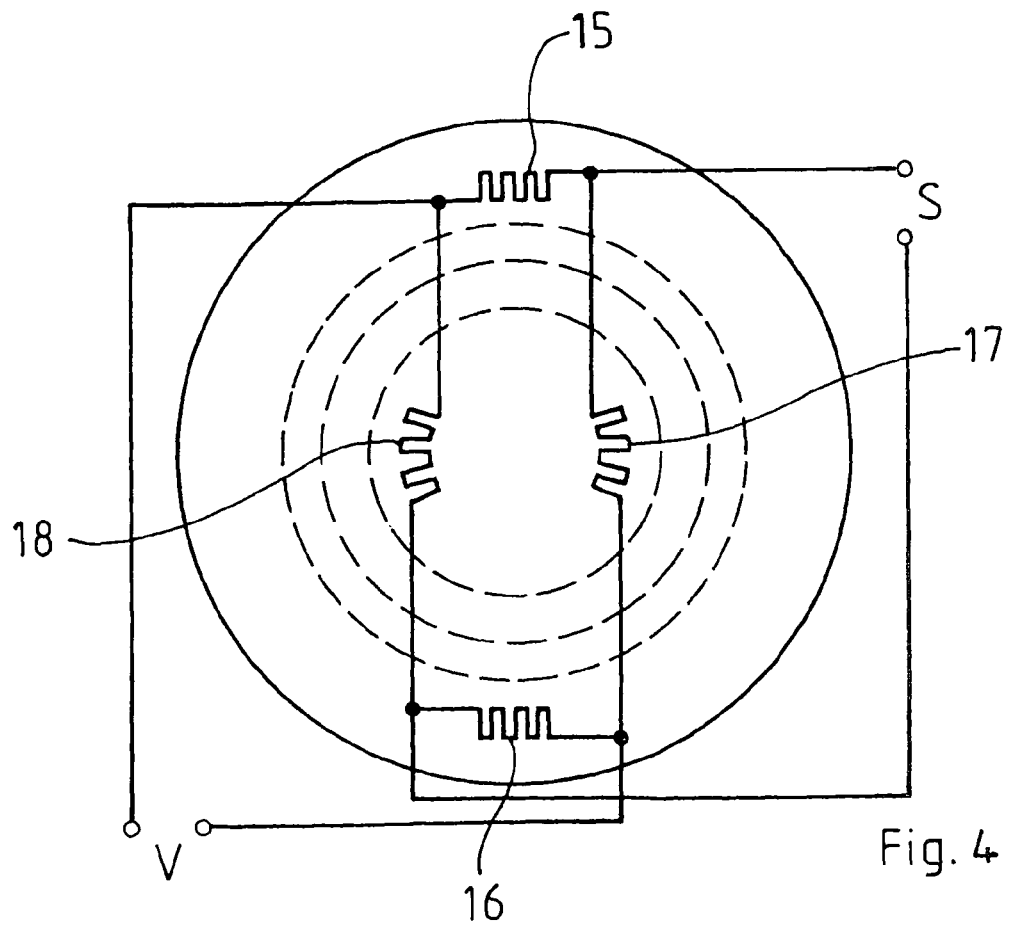

Details of the sensor body 9 arranged inside the location hole 8 and the strain gauges that are applied to it are shown in FIGS. 3 and 4.

Four strain gauges 15, 16 and 17, 18 are arranged on the face of the deformable disk 13 (on the bottom in FIG. 1-3). Although these strain gauges 15-18 in fact are disposed at an angular distance of 90° relative to one another, as can be seen in FIG. 4, these strain gauges 15-18 are shown in the cross sectional plane in FIG. 3 to provide a better view.

One can see that when the measuring spring is deformed under the effect of axial force, an upsetting deformation occurs in the area inside the diameter of the annular rib 10 on the face 13a of the deformable disk 13 (negative radial or tangential strain), which is recorded by the strain gauges 17 and 18 that are applied there.

At the same time a positive radial or tangential strain occurs on the edge of the disk 14 that is recorded by the strain gauges 15 through 18 that are applied on the face.

In the embodiment shown the strain gauges 15, 16 are in radial measuring direction. It also is possible to have the strain gauges in tangential measuring direction to record the strain that simultaneously occurs in circumferential direction.

The axial force transducer was described as a pressure force transducer. If the deformable element 1 is designed such that it also is possible to take up tensile forces, for example by means of a connecting thread (not shown), it is possible to have a pressure and/or tensile force transducer embodiment.

As can be seen in FIG. 4, the strain gauges 15, 16, as well as 17, 18 are connected so as to form an electrical resistance bridge, whose voltage supply V and signal output S are indicated. In a practical exemplary embodiment the ratio of the absolute strain variables on the strain gauges 15, 16 as well as 17, 18 is approximately 1:4.

The invention claimed is:

1. Axial force transducer comprising a deformable element which forms a measuring spring and is rotationally symmetrical to the force inducing axis as well as strain gauges that are arranged in pairs in areas extending in opposite directions and are connected so as to form an electrical resistance bridge, wherein the deformable element is provided with a central location hole which extends radially under the effect of an axial force and whose edge is connected to a deformable disk via an annular rib, the deformable disk being disposed at an axial distance from the location hole and the edge of the deformable disk radially protruding from the annular rib, and in that the strain gauges are applied to the face of the deformable disk in pairs, inside and outside the diameter of the annular rib.

2. Axial force transducer according to claim 1, wherein the strain gauges are applied in radial measuring direction.

3. Axial force transducer according to claim 1, wherein the strain gauges are applied in tangential measuring direction.

4. Axial force transducer according to one of the claims 1-3, wherein the two pairs of strain gauges are disposed at approximately equal radial distance in relation to the mean diameter of the annular rib.

5. Axial force transducer according to one of the claims 1 through 4, wherein the strain gauges are disposed at an angular distance of 90° in relation to one another.

6. Axial force transducer according to claim 1, wherein the annular rib and the deformable disk form a single piece sensor body that is connected to the edge of the deformable element that forms the measuring spring.

7. Axial force transducer according to claim 6, wherein the annular rib comprises a radially protruding force inducing flange that is connected to the edge of the location hole.

8. Axial force transducer according to one of the claims 1-7, wherein the annular rib is a hollow cylindrical ring.

9. Axial force transducer according to claim 6, wherein the deformable element is approximately bowl-shaped and in that the bottom of the bowl comprises the location hole that accommodates the sensor body.

10. Axial force transducer according to claim 9, wherein the bottom of the bowl substantially is a bendable membrane ring in the area that surrounds the location hole.

11. Axial force transducer according to claim 9, wherein the bottom of the bowl comprises an axially protruding force inducing ring.

* * * * *